(12) United States Patent  
St. Jacques, Jr.

(10) Patent No.: US 9,310,879 B2  
(45) Date of Patent: Apr. 12, 2016

(54) METHODS AND SYSTEMS FOR DISPLAYING WEB PAGES BASED ON A USER-SPECIFIC BROWSER HISTORY ANALYSIS

(75) Inventor: Robert J. St. Jacques, Jr., Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 443 days.

(21) Appl. No.: 13/292,302

(22) Filed: Nov. 9, 2011

(65) Prior Publication Data

US 2013/0117677 A1     May 9, 2013

(51) Int. Cl.
*G06F 17/00*     (2006.01)
*G06F 3/00*     (2006.01)
*G06F 17/22*     (2006.01)

(52) U.S. Cl.
CPC .............. *G06F 3/00* (2013.01); *G06F 17/2247* (2013.01)

(58) Field of Classification Search
CPC ........ G06F 3/00; G06F 17/2247; G06F 17/27
USPC ......................................................... 715/738
See application file for complete search history.

(56) References Cited

U.S. PATENT DOCUMENTS

| | | | |
|---|---|---|---|
| 7,194,693 B2* | 3/2007 | Cragun et al. ................. 715/747 |
| 7,495,795 B2* | 2/2009 | Graham et al. .............. 358/1.18 |
| 7,523,409 B2* | 4/2009 | Yolleck et al. ................ 715/777 |
| 2005/0160083 A1 | 7/2005 | Robinson |
| 2008/0250310 A1* | 10/2008 | Chen et al. ..................... 715/234 |
| 2008/0256046 A1* | 10/2008 | Blackman et al. ................. 707/3 |
| 2008/0319974 A1* | 12/2008 | Ma et al. ............................ 707/5 |
| 2009/0198654 A1* | 8/2009 | Surendran et al. ................ 707/3 |
| 2010/0235375 A1 | 9/2010 | Sidhu et al. |
| 2010/0280985 A1* | 11/2010 | Duchon et al. ................... 706/52 |
| 2011/0066982 A1* | 3/2011 | Paulsami et al. .............. 715/835 |
| 2012/0290599 A1* | 11/2012 | Tian et al. ..................... 707/758 |

* cited by examiner

*Primary Examiner* — Scott Baderman
*Assistant Examiner* — Howard Cortes
(74) *Attorney, Agent, or Firm* — Kermit D. Lopez; Luis M. Ortiz; Ortiz & Lopez, PLLC

(57) ABSTRACT

Methods and systems for automatically parsing the content of a user's browser history to extract information about that user's browsing habits, interests, likes, and dislikes utilizing text analytics and unsupervised machine learning. A topic model can be utilized to filter the display of web content and employ visualization techniques to highlight specific content (e.g. keywords) that correspond with the users specific tastes. The analysis can be as coarse or fine as the user desires and all of the analysis can be done locally on the user's own data processing device.

18 Claims, 4 Drawing Sheets

402

STORY HIGHLIGHTS

- NEW: Jurors don't make eye contact with Blagojevich
- NEW: "I frankly am stunned," Blagojevich says
- Jury convicts former Illinois governor of 17 public corruption counts.
- Rod Blagojevich is acquitted on one count, the jury couldn't decide two others Chicago -- Former Illinois Gov. Rod Blagojevich was convicted Monday on 17 of the 20 public corruption charges against him related to his attempt to sell the U. S. Senate seat held by Barack Obama before he resighed to become president

404

The 11 women and one man reached the verdicts on their 10th day of deliberation in the trial, which began April 20. As the verdicts were read, Blagojevich turned to look back at his wife, Patti who dorpped into her seat. None of the jouirs would look at the defendant as the verdicts were being read.

He was found guilty of all 10 counts involving wire fraud -- each of which carries a maximum penalty of 20 years in prison. The other 10 involved extortion and bribery. Most of the counts have a maximum penalty of 20 years in prison.

The jury acquitted Blagojevich on one count of bribery and was unable to reach verdicts on two counts of attempted extortion.

"I frankly am stunned." an uncharacteristically muted Blagojevich told reporters as he left the courtroom hand-in-hanc with his wife. "There's not much left to say, other than we want to go home to our little girls and talk to them and eplain things to them and then try to sory things. out. I'm sure we'll be seeing you guys again."

Click to play

Last August, after a two-month trial 14 days fo deliberation, another jury deadlocked on 23 of the 24 charges Blagojevich then faced. They found him guilty on one count of lying to FBI investigators, a conviction that could carry a prison sentence of five years.

*FIG. 4*

METHODS AND SYSTEMS FOR DISPLAYING WEB PAGES BASED ON A USER-SPECIFIC BROWSER HISTORY ANALYSIS

TECHNICAL FIELD

The disclosed embodiments generally relate to user specific content presentation. The disclosed embodiments also generally relate to topic modeling for use during information retrieval and display.

BACKGROUND

As the value and use of information continues to increase, individuals and businesses seek additional techniques for efficiently processing and analyzing information, especially with respect to information obtained from Internet sources. Currently many web pages offer contextual information to users that indicate the relationship between the web pages that they view and other information sources. Typically, these relationships are displayed visually as links to related content which may appear above, below, or alongside the content of the page currently being viewed. These relationships may also be presented as advertisements or other dynamic content, location based information gleaned from the user's network identity, or text visualizations (e.g. "tag clouds") that indicate the significance of related keywords. While these examples of information presented in parallel with the actual page content attempt to provide a personal context for the user reflecting the user's relationship with the content, in most cases it is not based on any significant level of user specific detail.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide a method for displaying user specific content through application of a topic model to web page content.

It is, therefore, another aspect of the disclosed embodiments to provide a customizable method by which a topic model can be generated.

It is, therefore, another aspect of the disclosed embodiments to provide for alteration of text content of a web page to highlight keywords associated with the topic model.

The aforementioned aspects and other objectives and advantages can now be achieved as described herein. Embodiments disclosed herein illustrate the use of unsupervised machine learning and text analytics to automatically parse the content of a user's browser history to extract information about that user's browsing habits, interests, likes, and dislikes. This information can then be utilized to filter the display of web content and employ visualization techniques to highlight specific content (e.g. keywords) that correspond with the user's specific tastes. The analysis can be as coarse or fine as the user desires (e.g. using the total browser history, a single day's history, or history for a specific tab). All of the analysis can be accomplished locally on the user's own data processing device, and filtering can be accomplished through a plug-in so that private information about the user and the user's browsing habits need not be transmitted to a server over the internet. Alternatively, cloud-based solutions are also possible to present a consistent contextual experience across multiple devices or platforms.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 1 illustrates a block diagram of a data-processing system that present embodiments may be adapted for use with;

FIG. 4 illustrates a pictorial representation of a web browser display of altered content resulting from application of the topic model to a selected web page, in accordance with the disclosed embodiments.

DETAILED DESCRIPTION

Figure 1:
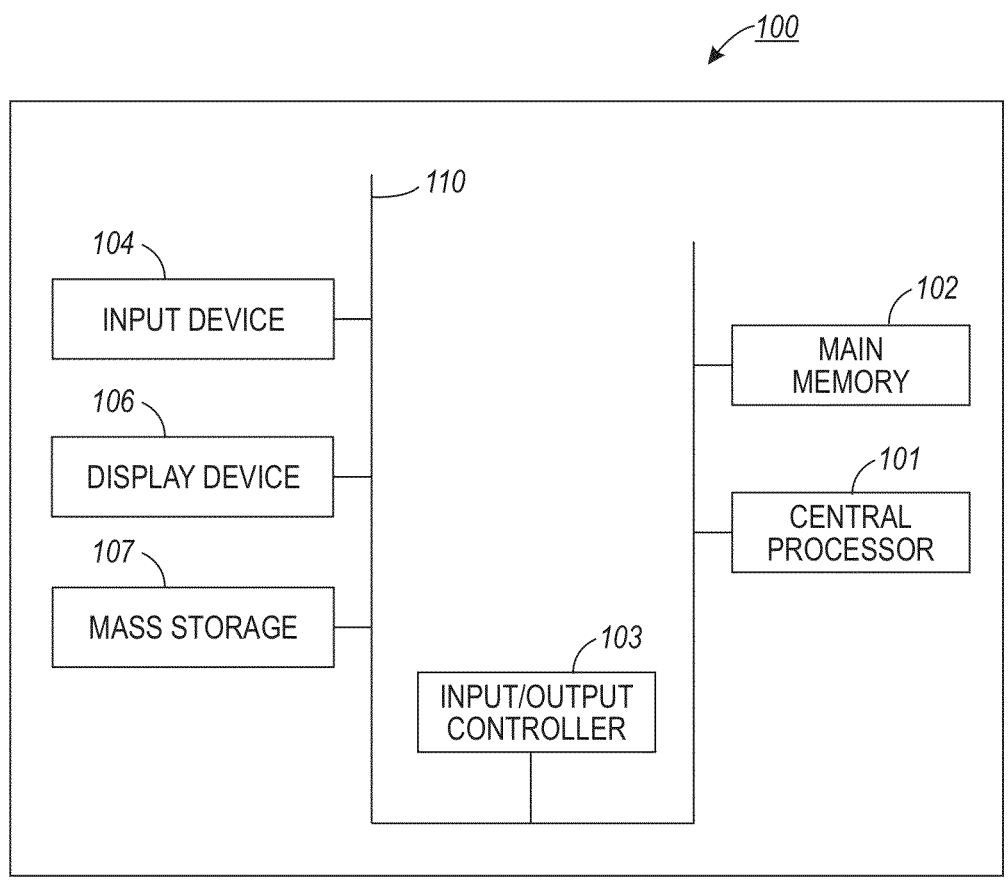

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having a computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, VisualBasic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The invention is described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Although not required, the disclosed embodiments will be described in the general context of computer-executable instructions such as program modules being executed by a single computer. In most instances, a "module" constitutes a software application. Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

FIG. 1 illustrates a block diagram of a data-processing system 100 that embodiments may be adapted for use with. The system 100 comprises a central processor 101, a main memory 102, an input/output controller 103, an input device 104 (e.g. a mouse, track ball, keyboard, touch screen, etc.), a display device 106, and a mass storage 107. As illustrated, the various components of the data-processing apparatus 100 communicate through a system bus 110 or similar architecture. Embodiments of such a data-processing may include personal computers, laptops, netbooks, tablets, cellular phones or any device having data-processing and networking capabilities. It should be appreciated that FIG. 1 is only exemplary and is not intended to assert or imply any limitation with regard to the environments in which aspects or embodiments can be implemented. Many modifications to the depicted environments can be made without departing from the spirit and scope of the disclosed embodiments.

The embodiments described herein can be implemented in the context of a host operating system on the data processing system 100 and one or more modules. Such modules may constitute hardware modules such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing apparatus and are typically composed of two parts. First, a software module may list the constants, data types, variables, routines and the like that can be accessed by other modules or routines. Second, a software module can be configured as an implementation, which can be private (i.e., accessible perhaps only to the module), and that contains the source code that actually implements the routines or methods upon which the module is based. The term "module" as utilized herein can therefore generally refer to software modules or implementations thereof. Such modules can be utilized separately or together to form a program product that can be implemented through non-transitory signal-bearing media, including transmission media and/or recordable media.

Figure 2:
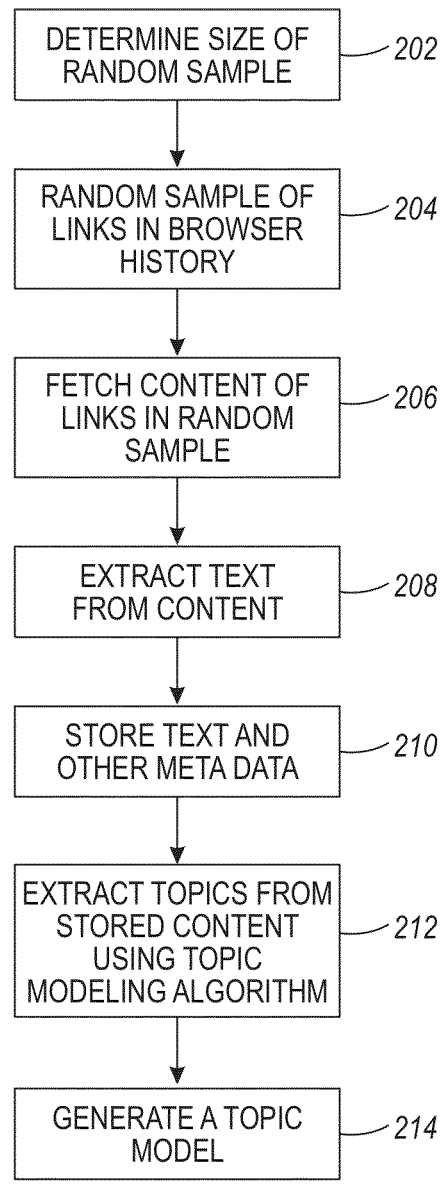
FIG. 2 illustrates a flow chart of operations illustrating logical operations of a text analysis method for generating a topic model, in accordance with the disclosed embodiments.

FIG. 2 illustrates a flow chart of logical operations of a text analysis method for generating a topic model, in accordance with the disclosed embodiments. It can be appreciated that the processes described are not intended to encompass all possible manifestations of the disclosed embodiments, but only to provide conceptual examples of possible implementations. For example, in computing, a web browsing history refers to the list of web pages a user has visited recently, which is recorded by the web browser software for a certain period of time. A random sample of the browser history can be utilized as training content in generating a topic model for use in altering content of subsequently viewed web pages.

As indicated at block 202, an operation can be implemented to determine the size of a random sample. For example, a random sample size can be determined once daily based on the number of links in the browser history and according to a simple algorithm (e.g., sample size=min(5000, total links)). Next, as depicted at block 204, the predetermined number of links from the browser history can be selected for the random sample. The random sample may also be taken at specific time periods such as once every other day or weekly. For each link in the random sample, the content can be fetched, as shown at block 206. The text can be extracted from the HTML, as described at block 208. The text can then be temporarily stored locally as indicated at block 210. Other meta data may also be stored (e.g. keywords identified in HTML tags, the original link to the content, etc.) as illustrated at block 210. When all of the relevant content has been stored, a topic-modeling algorithm, such as Latent Dirichlet Allocation (LDA), can be utilized to extract topics from the random sample, as depicted at block 212.

A variable number of topics may be extracted and each topic extracted contains a collection of keywords that describes content of the corpus. Topic extraction can be computationally intensive, especially if training content is fetched over the internet. Because of this, topic extraction should be executed in the background as a low priority process. A topic model can then be generated from the extracted topics, as described at block 214, which can then be utilized to alter the manner in which selected web content is displayed.

In an alternate embodiment, instead of performing the topic model generation on a specific schedule, the analytics process may instead respond dynamically to content as it enters the system. For example, as a new web page is downloaded for viewing, it can be evaluated against the current topic model to determine those topics with the highest probability of describing the page. The determination is made by providing every topic in the model with a probability score that is within a certain threshold of all of the other topics. For example, a web page can be evaluated using a topic model with N topics and the scores for each topic is all within a certain threshold of 1/N. Given a topic model with 4 topics in it (most topic models would have 100 or more topics), a web page is evaluated against the topic model and all of the scores are ¼+/−0.1 (i.e., 0.24, 0.26, 0.25, 0.25). This indicates that no one topic (or topics) is clearly better than any other at describing the document. This would indicate that the topic model has performed poorly and that there are no topics in the model that clearly describe the document. Upon a determination that a topic model has performed poorly, the topic model can be dynamically regenerated as described above.

Additionally, the level of granularity for the training content utilized may be customizable and need not include the entire browser history. Some alternative training content may include history, for example, for: the last month, the past week or the current browser session, and may also be limited to a particular browsing session or a specific tab within a browsing session. This feature allows users to utilize specific tabs for specific kinds of content and as they explore the content (e.g. following from one document to another) the view can gradually begin to highlight keywords that represent significant trends across the data.

Figure 3:
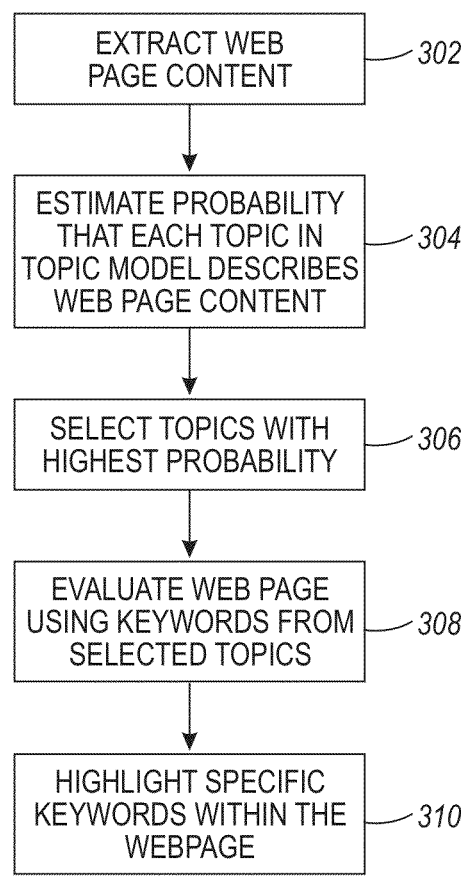
FIG. 3 illustrates a flow chart illustrating logical operations of a method for applying the generated topic model to selected web content, in accordance with the disclosed embodiments.

FIG. 3 illustrates a flow chart of operations of a method of applying the generated topic model to selected web content, in accordance with the disclosed embodiments. As indicated at block 302, when a new web page is downloaded, the text content can be extracted. The topic model can be utilized to estimate a probability score reflecting how accurately each topic in the model describes the text content, as depicted next at block 304. Topics that meet a predetermined criteria can be selected (e.g., the 5 topics with the highest probability scores are selected), as illustrated thereafter at block 306. Alternatively, the predetermined criteria might limit selection to only a certain number of topics or selecting those with a probability score above a certain threshold. Utilizing the keywords associated with the selected topics, the text content of the web page can then be evaluated, as described at block 308. This may require additional natural language processing to map different forms of keywords and synonyms to specific stemwords within the topic model. Specific keywords from the article can be thereafter highlighted for emphasis, as shown at block 310. For purposes of the disclosed embodiments, highlighting may refer to any alteration of the text or background in order to draw attention to certain words or phrases such as change of color or font size.

FIG. 4 illustrates a web browser display of altered content resulting from application of the topic model to a selected web page 402, in accordance with the disclosed embodiments. As shown in FIG. 4, different weights may be determined for different keywords 404 depending on how significant those words are determined to be (e.g., the frequency of occurrence in the article or the significance of the related keywords in the topics selected). The font size of the highlighted words reflects the weights determined for the highlighted keywords (i.e., the larger the font, the greater the weight of the keyword). Colors may also be utilized to signify the weights of the different highlighted keywords.

The disclosed process can be configured to run locally on the web user's personal computer such that no information need be shared over the internet, thus protecting the user's privacy. It is possible, however, for a cloud based solution to provide the same functionality across multiple platforms, including personal computers, laptops, smart phones, tablets, etc., by centrally storing results of the analysis. The advantage of a cloud based application is that web content viewed by a particular user can be highlighted regardless of the device used for viewing (e.g. laptop, smart phone, etc), whereas the version that runs locally on a PC can only be used from that particular device.

Based on the foregoing, it can be appreciated that a number of embodiments, preferred and alternative, are disclosed herein. For example, in one embodiment, a method for display user specific content can be implemented. Such a method can include, for example, selecting a random sample of a plurality of links from a browsing history, fetching content for each of the plurality of links in the random sample, extracting a plurality of topics from the content, generating a topic model from the plurality of topics, and highlighting specific words within a web page based on the topic model in order to display user specific content. In some embodiments, the aforementioned plurality of topics can comprise one or more keywords that describe the content. In other embodiments, a step can be implemented for extracting the plurality of topics utilizing Latent Dirichlet Allocation (LDA).

In still other embodiments, the step of highlighting specific words within a web page based on the topic model can further include extracting text content of the web page, determining a probability score for each of the plurality of topics in the topic model for how well each of the plurality of topics describes the text content, selecting a set of the plurality of topics that meet a predefined criteria, analyzing the text content utilizing the set of topics, and highlighting keywords associated with the set of topics within the text content of the web page. In yet other embodiments, the browsing history can be limited to history from, for example, a particular browsing session. In still other embodiments, the browsing history can be limited to history from a specific tab within a particular browsing session.

In other embodiments, computer-readable non-transitory storage media can be implemented, which includes instructions operable for displaying user specific content, to cause a computer/data-processing system to: select a random sample of a plurality of links from a browsing history, fetch content for each of the plurality of links in the random sample, extract a plurality of topics from the content, generate a topic model from the plurality of topics, and highlight specific words within a web page based on the topic model. In another embodiment, each of the plurality of topics can include one or more keywords that describe the content. In still another embodiment, the plurality of topics can be extracted utilizing Latent Dirichlet Allocation (LDA).

In still another embodiment of the aforementioned computer-readable non-transitory storage media, highlighting specific words within a web page based on the topic model can further include: extracting text content of the web page, determining a probability score for each of the plurality of topics in the topic model for how well each of the plurality of topics matches the text content, selecting a set of the plurality of topics that meet a predefined criteria, analyzing the text content utilizing the set of topics, and highlighting keywords from the set of topics within the text content of the web page. In yet another embodiment of the aforementioned computer-readable non-transitory storage media, the browsing history can be limited to history from a particular browsing session. In another embodiment of the aforementioned computer-readable non-transitory storage media, the browsing history can be limited to history from a specific tab within a particular browsing session.

In another embodiment, a system for displaying user specific content can be implemented. Such a system can include a processor (e.g., data-processor, data-processing apparatus, data-processing system, microprocessor, CPU, etc.) and a top-modeling module executable by the processor to implement text analysis. The topic modeling module and the processor can interpret and execute program instructions that enable the data processing system to select a random sample of a plurality of links from a browsing history, fetch content for each of the plurality of links in the random sample, extract a plurality of topics from the content, generate a topic model from the plurality of topics, and highlight specific words within a web page based on the topic model. In some embodiments, each of the plurality of topics can include a plurality of keywords that describe the content. In other embodiments, plurality of topics can be extracted utilizing Latent Dirichlet Allocation (LDA).

In still other embodiments of such a system, highlighting specific words within a web page based on the topic model can include, for example, extracting text content of the web page, determining a probability score for each of the plurality of topics in the topic model for how well each of the plurality of topics describes the text content, selecting a set of the plurality of topics that meet a predefined criteria, analyzing the text content utilizing the set of topics, and highlighting keywords from the set of topics within the text content of the web page.

In some embodiments of such a system, the browsing history can be limited to history from a particular browsing session. In still other embodiments of such a system, the browsing history can be limited to history from a specific tab within a particular browsing session. In other embodiments of such a system, highlighting specific words within the web page can be accomplished by altering font size of the specific words. In yet other embodiments of such a system, highlighting specific words within the web page can be accomplished by changing a background color behind the specific words.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for displaying user specific content, said method comprising:
   determining a size of a random sample of a plurality of links in a browser history;
   selecting a predetermined number of links from said plurality of links in said browser history for said random sample of said plurality of links;
   fetching content for each of said plurality of links in said random sample;
   extracting a plurality of topics comprising a variable number of topics from said content including text from HTML, said extracting of said plurality of topics executed in a background as a low priority process;
   generating a topic model from said plurality of topics extracted from said content, said topic model to be used to alter a manner in which selected web content is displayed;
   evaluating content of a newly selected web page against said topic model after generating said topic model to determine a probability score for each of said plurality of topics based on how accurately each of said plurality of topics describes said content of the newly selected web page and by providing every topic in said topic model with said probability score within a certain threshold of all other topics;
   selecting a subset of said plurality of topics based on said probability score;
   evaluating said content from said newly selected web page for keywords associated with said subset of topics and which represent significant trends across said subset of tonics; and
   highlighting said keywords within said newly selected web page based on said topic model in order to display user specific content.

2. The method of claim 1, wherein each of said plurality of topics comprises plurality of keywords that describe said content.

3. The method, of claim 2 further comprising extracting said plurality of topics utilizing Latent Dirichlet Allocation (LDA).

4. The method of claim 3 wherein highlighting specific words within a web page based on said topic model, further comprises:
   extracting content of said newly selected web page;
   determining a probability score for each of said plurality of topics in said topic model for how well said each of said plurality of topics describes said content;
   selecting a set of said plurality of topics that meet a predefined criteria
   analyzing said content utilizing said set of topics;
   determining a weight for each of a plurality of keywords associated with said set of topics, wherein different weights are determined for different keywords among said plurality of keywords depending how significant said each of said plurality of keywords are determined to be; and differentially highlighting said plurality of keywords associated with said set of topics within said content of said newly selected web page according to said weight.

5. The method of claim 4 further comprising limiting said browsing history to history from a particular browsing session and to history from a specific tab within a particular browsing session.

6. The method of claim 4 evaluating said content from said newly selected web page for keywords associated with said subset of topics and which represent significant trends across said subset of topics, further comprises utilizing natural language processing to map different forms of said keywords and synonyms to specific stem-words within said topic model.

7. A computer-readable non-transitory storage media comprising instructions operable for displaying user specific content to cause a computer to:
   determine a size of a random sample of a plurality of links in a browser history;
   select a predetermined number of links from said plurality of links in said browser history for said random sample of said plurality of links;
   fetch content for each of said plurality of links in said random sample;
   extract a plurality of topics comprising a variable number of topics from said content including text from HTML, said extracting of said plurality of topics executed in a background as a low priority process;
   generate a topic model from said plurality of topics extracted from said content, said topic model to be used to alter a manner in which selected web content is displayed;
   evaluate content of a newly selected web page against said topic model after generating said topic model to determine a probability score for each of said plurality of topics based on how accurately each of said plurality of topics describes said content of the newly selected web page and by providing every topic in said topic model with said probability score within a certain threshold of all other topics;
   select a subset of said plurality of topics based on said probability score;
   evaluate said content from said newly selected web page for keywords associated with said subset of topics and which represent significant trends across said subset of topics; and
   highlight said keywords within said newly selected web page based on said topic model in order to display user specific content.

8. The computer-readable non-transitory storage media of claim 7 wherein each of said plurality of topics comprises a plurality of keywords that describe said content.

9. The computer-readable non transitory storage media of claim 8 wherein said plurality of topics is extracted utilizing Latent Dirichlet Allocation (LDA).

10. The computer-readable non-transitory storage media of claim 9 wherein said highlight specific words within said web page based on said topic model, further comprises:
   extracting content of said newly selected web page;
   determining a probability score for each of said plurality of topics in said topic model for how well said each of said plurality of topics describes said content;
   selecting a set of said plurality of topics that meet a predefined criteria analyzing said content utilizing said set of topics;
   determining a weight for each of a plurality of keywords associated with said set of topics, wherein different weights are determined for different keywords among said plurality of keywords depending how significant said each of said plurality of keywords are determined to be; and
   differentially highlighting said plurality of keywords associated with said set of topics within said content of said newly selected web page according to said weight.

11. The computer-readable non-transitory storage media of claim 10 wherein said browsing history is limited to history from a particular browsing session and from a specific tab within said particular browsing session.

12. The computer-readable non-transitory storage media of claim 10 wherein said evaluate said content from said newly selected web page for keywords associated with said subset of topics and which represent significant trends across said subset of topics, further comprises utilizing natural language processing to map different forms of said keywords and synonyms to specific stem-words within said topic model.

13. A system for displaying user specific content, said system comprising:
   a processor; and
   a non-transitory computer-usable medium embodying computer program code, said non-transitory computer-usable medium capable of communicating with the processor, said computer program code comprising instructions executable by said processor and configured for:
      determining a size of a random sample of a plurality of links in a browser history;
      selecting a predetermined number of links from said plurality of links in said browser history for said random sample of said plurality of links;
      fetching content for each of said plurality of links in said random sample;
      extracting a plurality of topics comprising a variable number of topics from said content including text from HTML, said extracting of said plurality of topics executed in a background as a low priority process;
      generating a topic model from said plurality of topics extracted from said content, said topic model to be used to alter a manner in which selected web content is displayed;
      evaluating content of a newly selected web page against said topic model after generating said topic model to determine a probability score for each of said plurality of topics based on how accurately each of said plurality of topics describes said content of the newly selected web page and by providing every topic in said topic model with said probability score within a certain threshold of all other topics;
      selecting a subset of said plurality of topics based on said probability score;
      evaluating said content from said newly selected web page for keywords associated with said subset of topics and which represent significant trends across said subset of topics; and
      highlighting said keywords within said newly selected web page based on said topic model in order to display user specific content.

14. The system of claim 13 wherein each of said plurality of topics comprises a plurality of keywords that describe said content.

15. The system of claim 14 wherein said instructions are further configured for extracting said plurality of topics utilizing Latent Dirichlet Allocation (LDA).

16. The system of claim 15 wherein said instructions for highlighting specific words within a web page based on said topic model, further comprise instructions further configured for:
- extracting content of said newly selected web page;
- determining a probability score for each of said plurality of topics in said topic model for how well each of said plurality of topics describes said content;
- selecting a set of said plurality of topics that meet a predefined criteria;
- analyzing said content utilizing said set of topics;
- determining a weight for each of a plurality of keywords associated with said set of topics, wherein different weights are determined for different keywords among said plurality of keywords depending how significant said each of said plurality of keywords are determined to be; and
- differentially highlighting said plurality of keywords associated with said set of topics within said content of said newly selected web page according to said weight.

17. The system of claim 16 wherein said instructions are further configured for limiting said browsing history to history from a particular browsing session and from a specific tab within a particular browsing session.

18. The system of claim 16 wherein said instructions are further configured for utilizing natural language processing to map different forms of said keywords and synonyms to specific stem-words within said topic model.

* * * * *